June 7, 1927.
B W. TWYMAN ET AL
1,631,902
AUTOMATIC BRAKE FOR VEHICLES
Filed Sept. 29, 1926
2 Sheets-Sheet 1
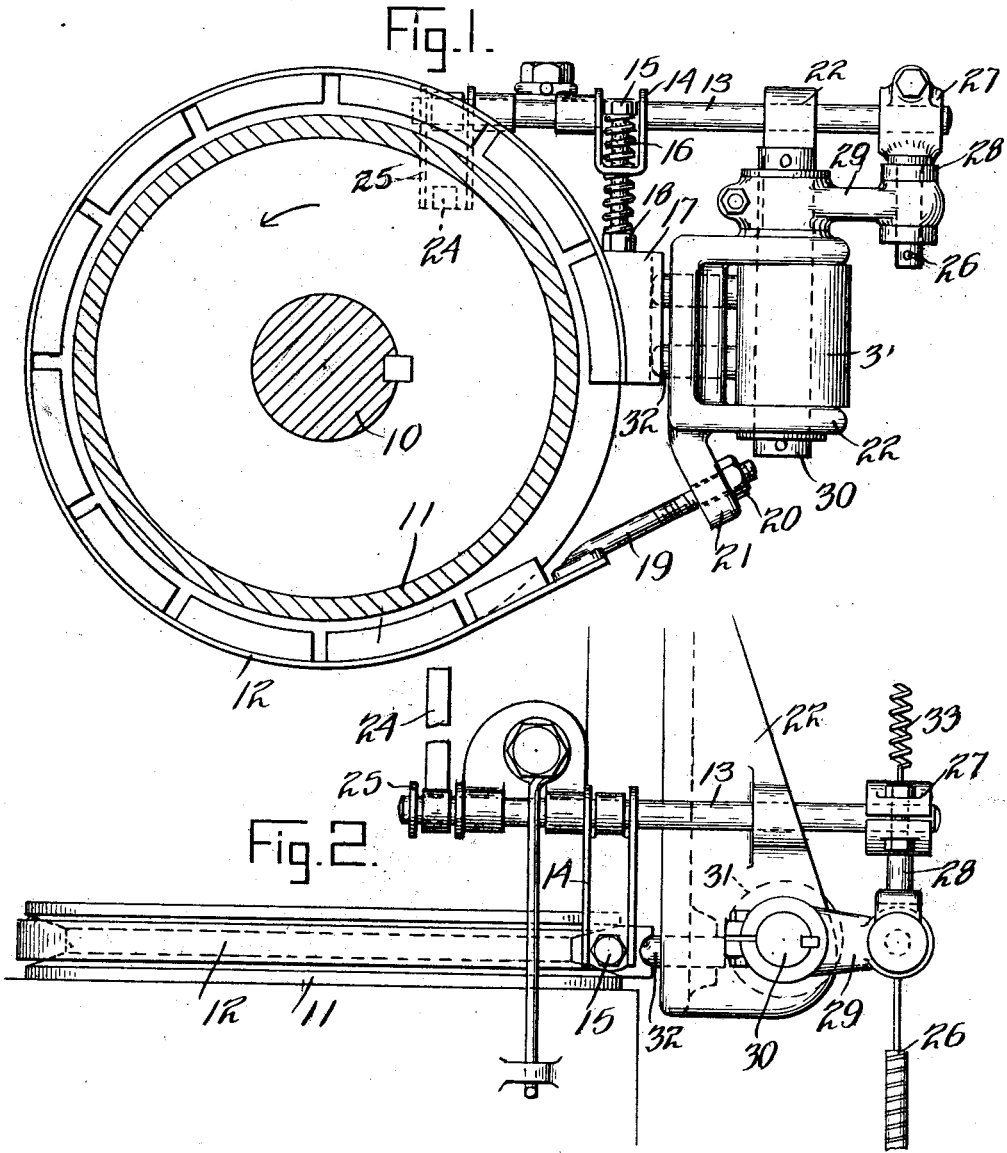
Inventors
B. W. Twyman
and Ralph B. Burton
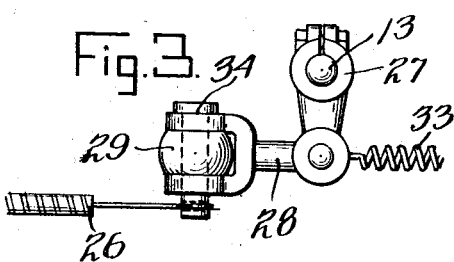
By
Attorney

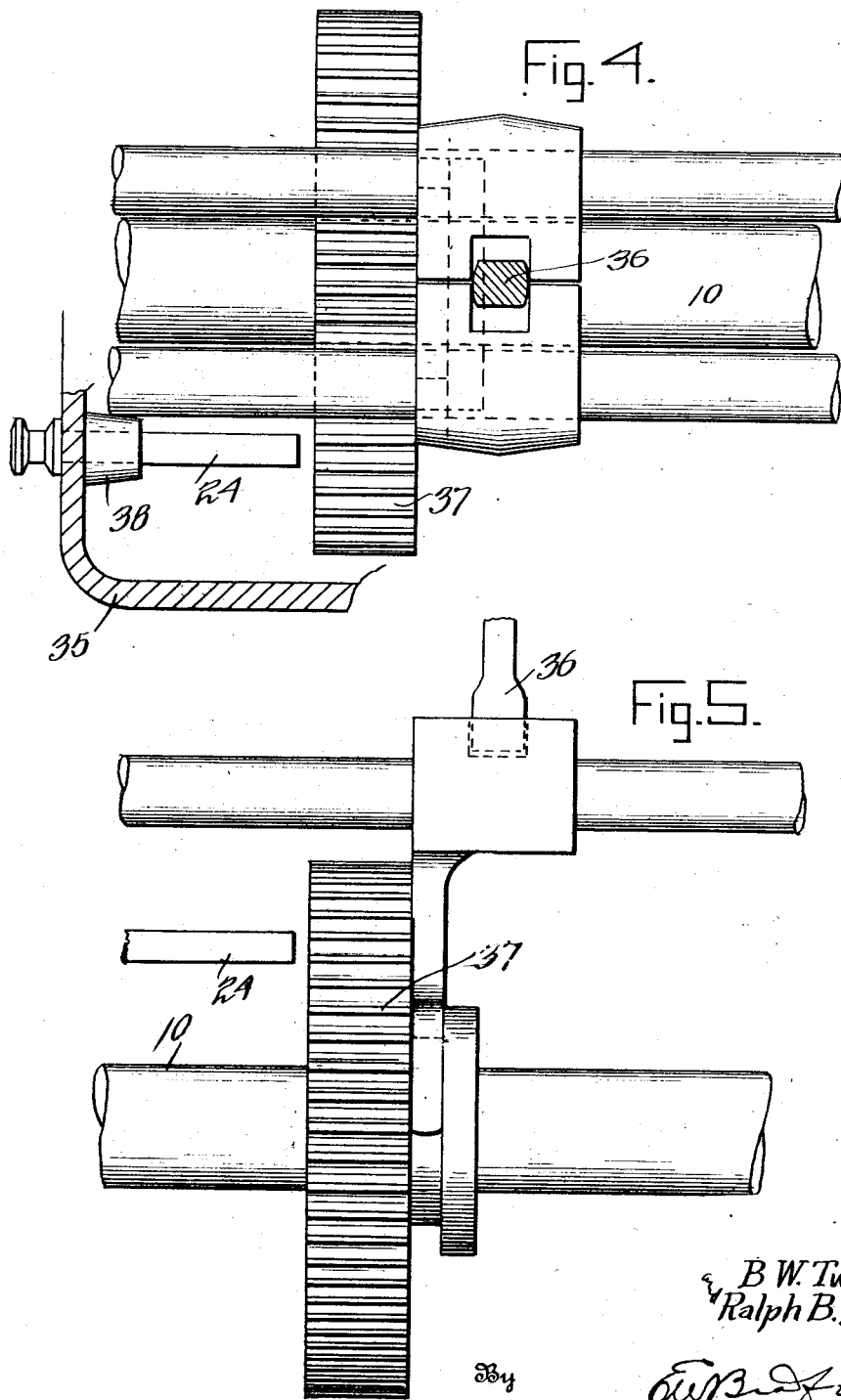

Patented June 7, 1927.

1,631,902

UNITED STATES PATENT OFFICE.

B WICKLIFFE TWYMAN, OF COLUMBUS, OHIO, AND RALPH B. BURTON, OF INDIANAPOLIS, INDIANA.

AUTOMATIC BRAKE FOR VEHICLES.

Application filed September 29, 1926. Serial No. 138,496.

In the use of automobiles and like vehicles serious accidents frequently happen because of the failure of the usual brakes to hold when stopping while ascending a grade, or while standing or during the operation of changing gears on grades, with the result that the vehicle runs back into an obstruction while the clutch is released and the usual brakes not set or in working order.

Our said invention relates to an automatic braking device for preventing a reverse rotation of a member normally rotatable in a given direction and subject to be rotated contrary to its normal rotation by some extraneous force, e. g. the drive shaft of an automobile which normally rotates in a given direction will be rotated in a manner opposite to said given direction when the automobile is on a hill and the car starts backward.

It is an object of the invention to provide a brake of this character, suitable for application to the drive shaft or other part of an automobile or other vehicle having a part which rotates in an opposite direction when the vehicle moves backward which will prevent reverse rotation thereof when on grades, or when brakes fail to hold or when a gear change is necessary on a grade thus preventing the vehicle from accidentally backing down the grade, over a bank or into an obstruction due to the failure of the brakes to hold, or when the power is shut off either purposely or accidentally, or during a gear changing operation.

Another object of the invention is to provide an automatic brake which may be readily embodied in the construction of the ordinary transmission brake applied ordinarily to the drive shaft of automobiles or the like without material alteration of the construction of the transmission brake itself and which will effectively and automatically lock the wheels of the vehicle against backward rotation.

Referring to the accompanying drawings which are made a part hereof and on which similar reference characters indicate similar parts, Figure 1 is a transverse section through a transmission brake drum illustrating one application of our invention, Figure 2, a top plan,

Figure 3, a detail,

Figure 4, a top plan view of the transmission, and

Figure 5, a transverse longitudinal section of the transmission.

In the drawings reference character 10 indicates a drive shaft which extends into a transmission case 35 enclosing a gear shift lever 36 and a reverse transmission gear 37 adapted to be shifted longitudinally into and out of operative position all of which is of the usual construction. To the shaft 10 is keyed a transmission brake drum 11 for cooperation with a brake band 12. Said brake band 12 consists of a plurality of arcuate wedge sections and is adapted to be operated for gripping the brake drum and for preventing rotation of the same in one direction. The brake drum and band may have either plain, V-type or other cooperating surfaces, however, a V-type surface is preferable as it requires less area due to increased friction between the coacting wedge surfaces. The brake band and drum are preferably of different materials, the drum being preferably of cast iron, malleable iron or steel while the brake band is preferably made of softer material, such as brass, fiber or compounded material such as "condensite" or the like, although the wedge or brake shoe 17 may be made of harder material than the arcuate brake band segments.

A bar or shaft 13 is mounted transversely of the shaft 10 and has fixed thereon a cradle 14 in which is supported an adjustable screw 15. A pair of springs 16 are disposed between the extremities of said screw and said cradle and serve to resiliently support said screw. A wedge or brake shoe 17 connected to and forming the extremity of the brake band 12 is threadedly connected to said screw and a lock nut 18 is provided for locking the screw in proper adjusted position. The opposite end of the brake band is provided with an adjusting stud 19 having a nut 20 thereon, and said adjusting stud extends through a perforation in a depending boss 21 carried by a bracket 22 rigidly fastened to the side of the transmission case. With this construction the normal rotation of the drive shaft 10 and brake drum 11 in the direction of the arrow shown in Fig. 1 will not be materially interferred with by the brake band but the said rotation will tend to lift the brake shoe 17 and release all of the sections of the brake band associated therewith from the brake drum. However, a rotation contrary to the normal direction of the driving shaft and brake drum will tend to force the brake shoe 17 downwardly into intimate wedging engagement with the brake drum and this operation will draw all of the sections of the brake band into frictional engagement with the brake drum thereby distributing the braking load evenly around the contacting surfaces of the band and drum.

In order to prevent the operation of this braking means during the operation of the car when the gearing is shifted to "reverse" we provide a connecting element or pin 24 mounted in a boss 38 in the transmission case said pin being actuated by the reverse gear when the same is shifted by moving the gear shift lever from neutral position to reverse position. Said connecting element engages a lever 25 fixed on the shaft 13 and when said lever 25 is operated to rock the shaft 13 the spring cradle will be moved upwardly to compress the uppermost spring 16 and lift the brake shoe 17 through the medium of the adjustable screw 15 to inoperative position out of engagement with the brake drum. In like manner since the brake band is actuated by the brake shoe the entire brake band will be withheld from snug or intimate engagement with the brake drum.

The lever 27 is connected by means of a link 28 to a lever 29 mounted on the upper end of a shaft 30 supported in the bracket 22. An eccentric 31 is fixed on said shaft 30 and is adapted to be rotated for moving pins 32, supported in spaced parallel relation in the portion of the bracket adjacent the brake shoe 17 and normally engaging the same, longitudinally to hold the brake shoe in position to be effective or to permit the pins to be retracted out of position to cause operation of said brakes. A spring 33 is connected to a lever 27 which connects the bifurcated ends of the link 28 and the lever 29 for normally holding them in predetermined position. The spring 33 has its outer end fastened to some suitable anchorage and said spring furnishes sufficient tension to return the releasing mechanism to an operative position, unless held in an inoperative position by the "Bowden" wire control 26 or change speed lever 36.

In order to render the device inoperative from without the vehicle so that the car may be moved backward when necessary as in case of fire or the like a "Bowden" wire 26 is provided and the same extends from a lever 29 mounted on the shaft 30 to any desired point outside of the vehicle.

When the "Bowden" wire is pulled the lever 29 through the connection 28 will cause the lever 27 to rock the shaft 13 lifting the brake shoe. Also at the same time the lever 29 rocks shaft 30 and eccentric 31 mounted thereon to permit the pins 32 to move rearwardly to render the device inoperative whereupon the vehicle may be freely moved backwards.

When the car is proceeding normally in a forward direction the motor or the inertia of the vehicle imparts to the transmission brake drum a rotation in the direction of the arrow in Fig. 1. This rotation tends to move the brake shoe out of engagement with the brake drum and causes the brake band through the friction on the blocks which form the same to raise the wedge end of the band and relieve the drum from all load except a slight friction load due to the weight of the band itself. This permits free movement of the vehicle at all speeds in a forward direction without any appreciable loss of power. At all times except when the gear set is in the reverse driving position or when the "Bowden" wire control has made the lock inoperative as soon as the vehicle starts backward and a backward rotation is transmitted to the drive shaft 10 and drum 11, the friction set up between the drum 11 and the inner faces of the brake band will pull the V-blocks which form the band tightly against the drum and the more the drum tends to revolve the more tightly the band is pulled into engagement therewith thus absorbing all tendency for backward rotation of the drum and bringing the vehicle to an immediate yet gentle stop.

Our invention relieves strain on the emergency and foot brakes when applied on an automobile or other vehicle due to the tendency of the vehicle to have backward motion imparted to it by gravity. The construction illustrated is capable of incorporation with facility on all vehicles, either in the process of manufacture or those already constructed and at an extremely small cost, whether mounted on either the transmission, wheel drum or any other moving part of the vehicle which has a reverse rotation when the car is going backward to that which it ordinarily has when the car is proceeding in a forwardly or normal direction. The device will also render it unnecessary to operate a foot or hand brake to keep the vehicle from backing or until the power of the engine is clutched to the drive wheels and greatly facilitates starting the vehicle up an incline. The brake is released by the source of power itself when the source of power is applied to drive the vehicle in a forward direction, and is applied by the reverse rotation of the rotating member.

It will be obvious to those skilled in the art that various changes may be made in our device without departing from the spirit of the invention and therefore we do not limit ourselves to what is shown in the drawings and described in the specification but only as indicated in the appended claims.

Having thus fully described our said invention, what we claim as new and desire to secure by Letters Patent, is:

1. The combination with a rotatable element of means disposed in fixed relation to said rotatable element, and wedging means movable substantially vertically between said rotatable element and said means in fixed relation arranged to be frictionally withheld from intimate wedging engagement between said fixed and rotatable element by said rotatable element when it is operating in one direction but arranged to be drawn by gravity and friction into intimate wedging engagement between said members by said rotatable element when it is rotating in the reverse direction, substantially as set forth.

2. The combination in a motor vehicle having change speed transmission gearing and a lever for shifting said gearing, of a rotatable element, gravity and friction operated means for preventing reverse rotation of said rotatable element and means operable by said lever for rendering inactive said reverse rotation preventing means, substantially as set forth.

3. The combination of a rotating e'ement, a brake drum associated therewith, a fixed bracket adjacent to said brake drum, a wedging element supported between said fixed bracket and said brake drum, and a brake band having one end connected to said wedging element and extending around said brake drum and having its opposite end fixed to said bracket permitting free rotation of the brake drum in one direction but preventing rotation in the opposite direction, substantially as set forth.

4. The combination of a brake drum, a brake band associated with said brake drum, having one end secured in fixed position and the opposite end yieldably supported whereby when the brake drum is rotated in one direction the band will be lifted substantially out of engagement therewith and permit free rotation of the drum but upon a reverse rotation of the drum the band will grip the drum and prevent rotation thereof, substantially as set forth.

5. The combination of a rotating element, a brake drum associated therewith, a fixed bracket adjacent to said brake drum, a wedging element supported between said fixed bracket and said brake drum, a brake band having one end connected to said wedging element and extending around said brake drum and having its opposite end fixed to said bracket permitting free rotation of the brake drum in one direction but preventing rotation in the opposite direction and means for rendering inoperative said wedging element, substantially as set forth.

6. The combination of a rotating element, a brake drum associated therewith, a fixed bracket adjacent to said brake drum, a wedging element supported between said fixed bracket and said brake drum, a brake band having one end connected to said wedging element and extending around said brake drum and having its opposite end fixed to said bracket permitting free rotation of the brake drum in one direction but preventing rotation in the opposite direction and means for rendering inoperative said wedging element, when it is desired to operate the rotating element in a reverse direction, substantially as set forth.

7. The combination of a rotating element, a brake drum associated therewith, a fixed bracket adjacent to said brake drum, a wedging element supported between said fixed bracket and said brake drum, a brake band having one end connected to said wedging element and extending around said brake drum and having its opposite end fixed to said bracket permitting free rotation of the brake drum in one direction but preventing rotation in the opposite direction, means for rendering said device inoperative, said means comprising a shaft, a cradle on said shaft resiliently supporting said wedging element, and means for oscillating said shaft to elevate said wedging element, substantially as set forth.

8. The combination of a rotating element, a brake drum associated therewith, a fixed bracket adjacent to said brake drum, a wedging element supported between said fixed bracket and said brake drum, a brake band having one end connected to said wedging element and extending around said brake drum and having its opposite end fixed to said bracket permitting free rotation of the brake drum in one direction but preventing rotation in the opposite direction, means for rendering said device inoperative, said means comprising a shaft, a cradle on said shaft, resiliently supporting said wedging element, and means comprising a connection between the gear shift lever and said shaft for oscillating said shaft to elevate said wedging element, substantially as set forth.

9. The combination of a rotatable brake drum, a bracket mounted adjacent said brake drum, a pin carried by said bracket and projecting toward said brake drum, and a brake shoe supported between said pin and brake drum and adapted to lock the brake drum against rotation in one direction but adapted to permit free rotation in the opposite direction, substantially as set forth.

10. The combination of a rotatable brake drum, a bracket mounted adjacent said brake drum, pins carried by said bracket and projecting toward said brake drum, a brake shoe supported between said pins and brake drum and adapted to lock the brake drum against rotation in one direction but adapted to permit free rotation in the opposite direction, and means for withdrawing said brake shoe from operative position, substantially as set forth.

11. The combination with a brake drum, a bracket extending over the periphery of said drum, an eccentric roller supported by said bracket, a pin carried by said bracket and having one end adjacent the periphery of said eccentric roller and having its other end in proximity to said brake drum, a brake shoe mounted between the end of said pin and said brake drum for frictionally engaging the drum when the same rotates in one direction but permitting free rotation in the opposite direction, and means for rotating said eccentric roller to render the brake shoe inoperative, substantially as set forth.

12. The combination in an automobile, of a brake drum, a bracket extending over the periphery of said drum, an eccentric roller supported by said bracket, a pin carried by said bracket and having one end adjacent the periphery of said eccentric roller and having its other end in proximity to said brake drum, a brake shoe mounted between the end of said pin and said brake drum for frictionally engaging the drum when the same rotates in one direction but permitting free rotation in the opposite direction, and means for rotating said eccentric roller to render the brake shoe inoperative said means comprising a connection to the gear shift lever, substantially as set forth.

13. The combination with a brake drum, a bracket extending over the periphery of said drum, an eccentric roller supported by said bracket, a pin carried by said bracket and having one end adjacent the periphery of said eccentric roller and having its other end in proximity to said brake drum, a brake shoe mounted between the end of said pin and said brake drum for frictionally engaging the drum when the same rotates in one direction but permitting free rotation in the opposite direction, manually operable means for rotating said eccentric roller to render the brake shoe inoperative, and additional automatically operable means for rendering said brake shoe inoperative, substantially as set forth.

14. The combination of a brake drum, a bracket mounted in close proximity thereto, an eccentric roller supported in said bracket, a pin having one end in position to be engaged by the periphery of said roller, a brake shoe between the opposite end of said pin and the brake drum, a shaft having a connection with said eccentrically mounted roller, automatically operable means for rotating the shaft to cause the roller to move the pins into engagement with the brake shoe for causing the brake shoe to prevent rotation of the brake drum in a given direction but permitting free rotation in the opposite direction, substantially as set forth.

15. The combination in an automobile of a rotatable element, a brake drum associated with said rotatable element, a brake band associated with said brake drum and including a wedging element, a bracket mounted in fixed relation to said brake drum, a pair of pins movable longitudinally through said bracket into position to contact said wedging element, a shaft mounted in said bracket and having an eccentric thereon adapted to move said pins longitudinally, a lever mounted on said shaft, spring means for holding said lever in a predetermined position, and means for operating said lever to permit the pins to be retracted from engagement with the brake shoe, substantially as set forth.

16. The combination in an automobile of a rotatable element, a brake drum associated with said rotatable element, a brake band associated with said brake drum and including a wedging element, a bracket mounted in fixed relation to said brake drum, a pair of pins movable longitudinally through said bracket into position to contact said wedging element, a shaft mounted in said bracket and having an eccentric thereon adapted to move said pins longitudinally, a lever mounted on said shaft, spring means for holding said lever in a predetermined position means for operating said lever to permit the pins to be retracted from engagement with the brake shoe, and additional means for lifting said brake shoe, substantially as set forth.

17. The combination of a rotatable element, a fixed element disposed adjacent the rotatable element, a wedge associated with said rotatable and fixed elements and arranged to permit rotation of the rotatable element in one direction but arranged to move downwardly between the rotatable and fixed elements to prevent rotation of the rotatable element in the opposite direction, substantially as set forth.

In witness whereof, we have hereunto set our hands at Indianapolis, Indiana this 23rd day of September, A. D. nineteen hundred and twenty-six.

B WICKLIFFE TWYMAN.
RALPH B. BURTON.